United States Patent [19]

Jureit

[11] E Re. 28,908

[45] Reissued July 20, 1976

[54] FLUID ACTUATED PRESS

[75] Inventor: John Calvin Jureit, Coral Gables, Fla.

[73] Assignee: Automated Building Components, Inc., Miami, Fla.

[22] Filed: Mar. 28, 1975

[21] Appl. No.: 563,059

Related U.S. Patent Documents

Reissue of:

[64] Patent No.: 3,750,562
Issued: Aug. 7, 1973
Appl. No.: 190,724
Filed: Oct. 20, 1971

[52] U.S. Cl. ..... 100/100; 100/258 A; 100/269 R

[51] Int. Cl.[2] ..... B30B 1/32

[58] Field of Search..... 100/DIG. 13, 100, 258 A, 100/258 R, 271, 270, 276, 283, 295

[56] References Cited

UNITED STATES PATENTS

| | | | |
|---|---|---|---|
| 2,224,968 | 12/1940 | Klocke | 100/258 R |
| 2,446,823 | 8/1948 | Grant | 100/258 A |
| 3,195,449 | 7/1965 | Jureit | 100/DIG. 13 |
| 3,358,348 | 12/1967 | McGlinchey | 100/DIG. 13 |

FOREIGN PATENTS OR APPLICATIONS

| | | | |
|---|---|---|---|
| 382,644 | 10/1923 | Germany | 100/270 |
| 1,071,665 | 6/1967 | United Kingdom | 100/258 A |

*Primary Examiner*—Billy J. Wilhite
*Attorney, Agent, or Firm*—LeBlanc & Shur

[57] ABSTRACT

The press includes a base structure carrying a press platen and an upper floating head carrying a press platen, the floating head being movable toward and away from the base. A fluid-actuated cylinder is provided at each end of the press to raise and lower the head. A load transfer assembly interconnects opposite ends of the press and includes a transfer bar pivotally connected at opposite ends to bellcranks at opposite ends of the base. Rods at opposite ends of the press connect between the bellcranks and head. When the press is subjected to asymmetrical loadings, the load transfer apparatus transfers a portion of the force applied to the head by the cylinder at one end of the press to the head at the opposite end of the press.

10 Claims, 5 Drawing Figures

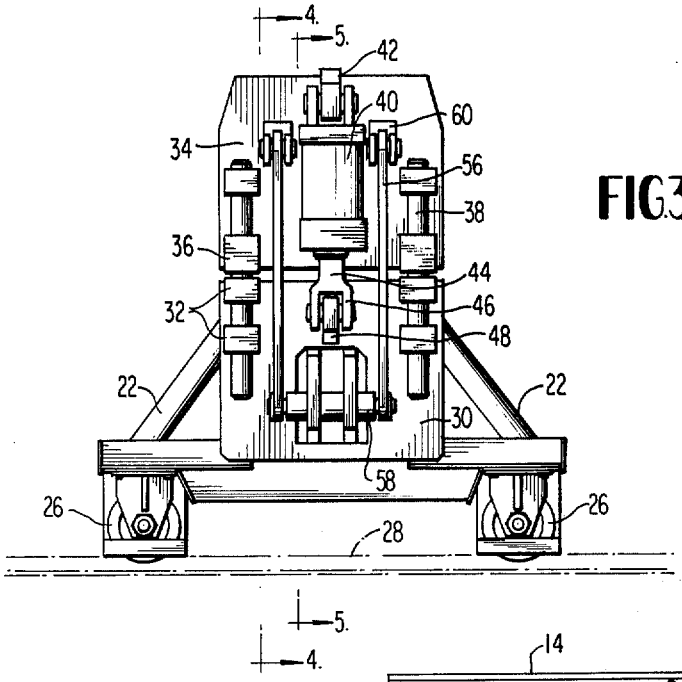
FIG.3
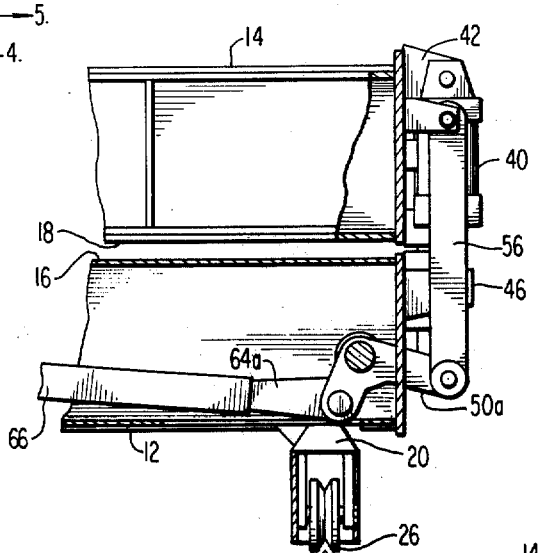
FIG.4
FIG.5
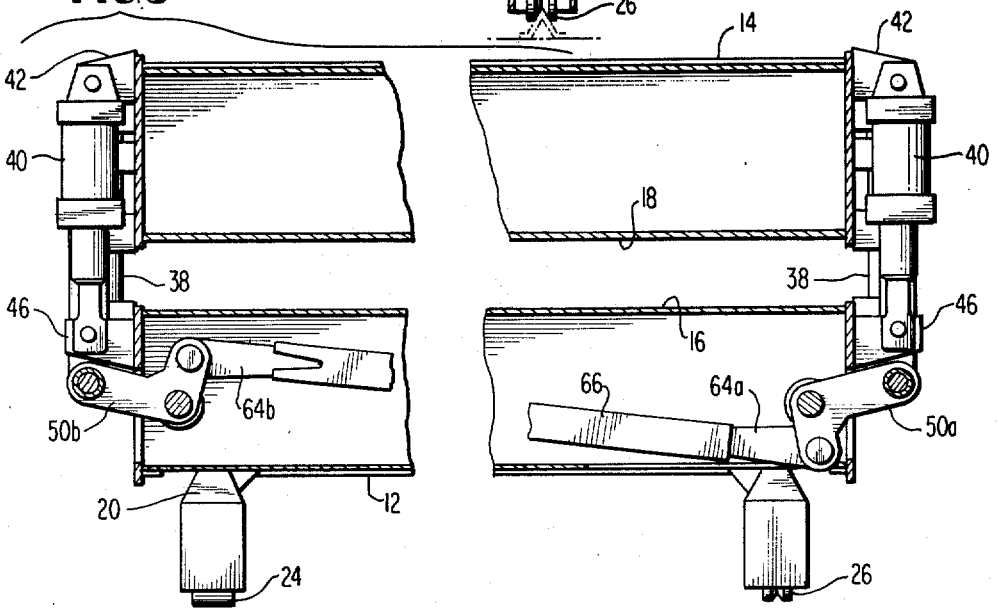

FLUID ACTUATED PRESS

Matter enclosed in heavy brackets [ ] appears in the original patent but forms no part of this reissue specification; matter printed in italics indicates the additions made by reissue.

The present invention relates to a novel and improved press and particularly relates to a press of the type useful for embedding connector plates into the joints of wooden trusses and the like.

The building construction industry has recently made tremendous strides forward with the advent of prefabricated wooden trusses, panels, and the like. Such trusses comprise wooden framing members, in most cases fastened together at their joints by nail plates, for example, of the type disclosed in U.S. Pat. No. 2,877,520 of common assignee herewith. A number of methods for applying the nail plates to the butt joints, such as hand nailing, utilizing individual power-operated presses at each joint, etc., have variously proven time-consuming, laborious, expensive, and not susceptible to large-scale automated truss fabrication tecniques.

Truss fabrication techniques have advanced to the state where power-operated presses for embedding the nail plates into the joints of the wooden frame members are utilized. One such truss fabrication technique provides for the prepositioning of the frame members on a jig table in the pattern of the truss with the connector plates spotted on opposite sides of the joints of such members. Thereafter, the connector plates are pressed into the joints to fasten the frame members together and form a completed truss, panel, or the like. Presses capable of providing the foregoing action are disclosed in U.S. Pat. Nos. 3,079,607 and 3,195,449 of common assignee herewith.

In U.S. patent application Ser. No. 867,730, filed Oct. 20, 1969, now U.S. Pat. No. 3,603,244 which issued Sept. 7, 1971, of common assignee herewith, there is disclosed a toggle-actuated press mounted for movement along a track and a control system for periodically stopping the press in a pressing position with the press platen located over the connector plates of the joints of the wooden members. The press of that application is disclosed more fully in U.S. Pat. No. 3,520,252, issued July 14, 1970, also of common assignee herewith. While the press disclosed in that application and patent has operated satisfactorily, particularly where the loadings across the press are substantially uniform, asymmetrical loadings have caused problems. Asymmetrical loadings are caused by the differences in location of the joints of the various types and sizes of trusses. Further, in those presses which mount fluid-actuated cylinders at their opposite ends, for example, the presses disclosed in U.S. Pat. Nos. 3,079,607 and 3,195,449, only the cylinder or the cylinders at one end of the press are generally effective with respect to the eccentric load. Consequently, these presses are limited in capacity when subjected to asymmetrical loadings to substantially the capacity of the cylinder or cylinders at one end of the press.

The present invention provides a novel and improved fluid-actuated press which eliminates and/or minimizes problems associated with the foregoing described and other presses and provides a novel press having various advantages in construction and operation as compared with such prior presses. The press hereof is particularly adapted for embedding nail plates into the joints of wooden members forming trusses, panels, and the like, and wherein asymmetrical loadings are experienced. Specifically, the present invention provides a press mounted on wheels for movement along tracks. The press includes a lower support structure or base and a floating head carrying an upper press platen slidable with the head for reciprocating movement toward and away from the base. A fluid-actuated cylinder is provided at each end of the press and connects between the base and the head. Suitable guides at opposite ends of the press are also provided.

In use, a jig table is supported above the tracks. Wooden frame members are prepositioned on the jig table in the pattern of a truss, panel, or the like, and connector plates are spotted on opposite sides of the joints thereof. The press is then moved along the jig table. Whenever a joint with the prepositioned nail plates is located between the press platens, the press stops, embeds the nail plates into the joint, and moves on to the next joint.

It is a feature of the present invention that, when the press is subjected to asymmetrical loadings, the unused pressing capacity at one end of the press is transferred to its opposite end to provide a uniform loading along the entirety of the press. To accomplish this, a load transfer apparatus interconnects opposite ends of the press and includes at each end a bellcrank pivotally mounted to the base and a pair of rods pivotally connected at opposite ends to the bellcrank and movable head. A transfer bar interconnects the bellcrank at opposite ends of the press.

In response to asymmetrical loading, the force applied by the cylinder at the unloaded or partially loaded end of the press is transferred to the loaded end through the rod, bellcranks, and transfer bar. Particularly, the rods at the unloaded or partially loaded end of the press lie in compression and rotate the bellcrank to place the transfer bar in compression *or tension depending upon the orientation of the bell crank*. The bellcrank at the loaded end of the press is thereby rotated in the opposite direction. Rotation of the latter bellcrank tensions the rods at the loaded end of the press. The net result of this action is to transfer in part the load applied to the head by the cylinder at the unloaded or partially loaded end of the press to the fully loaded end of the press. Also, by utilizing the load transfer apparatus hereof, the capacity of the press is maintained at substantially the sum of the capacities of the individual cylinders at the opposite ends of the press.

Accordingly, it is a primary object of the present invention to provide a novel and improved press for embedding connector plates into the joints at prepositioned wooden members forming trusses, panels, and the like.

It is another object of the present invention to provide a novel and improved press having a load transfer apparatus particularly useful in handling asymmetrical press loadings.

It is still another object of the present invention to provide a novel and improved press wherein the press capacity is maintained as substantially the sum of the capacity of the individual cylinders at opposite ends of the press.

It is a further object of the present invention to provide a novel and improved press having the foregoing characteristics and mounted on wheels for movement along a track.

It is a still further object of the present invention to provide a novel and improved press which is rugged, sturdy, and inexpensive in construction.

These and further objects and advantages of the present invention will be more apparent upon reference to the following specification, claims, and appended drawings, wherein:

FIG. 3 is an end elevational view thereof; and

FIGS. 4 and 5 are fragmentary cross-sectional views taken generally about on lines 4—4 and 5—5, respectively in FIG. 3.

Figure 1:
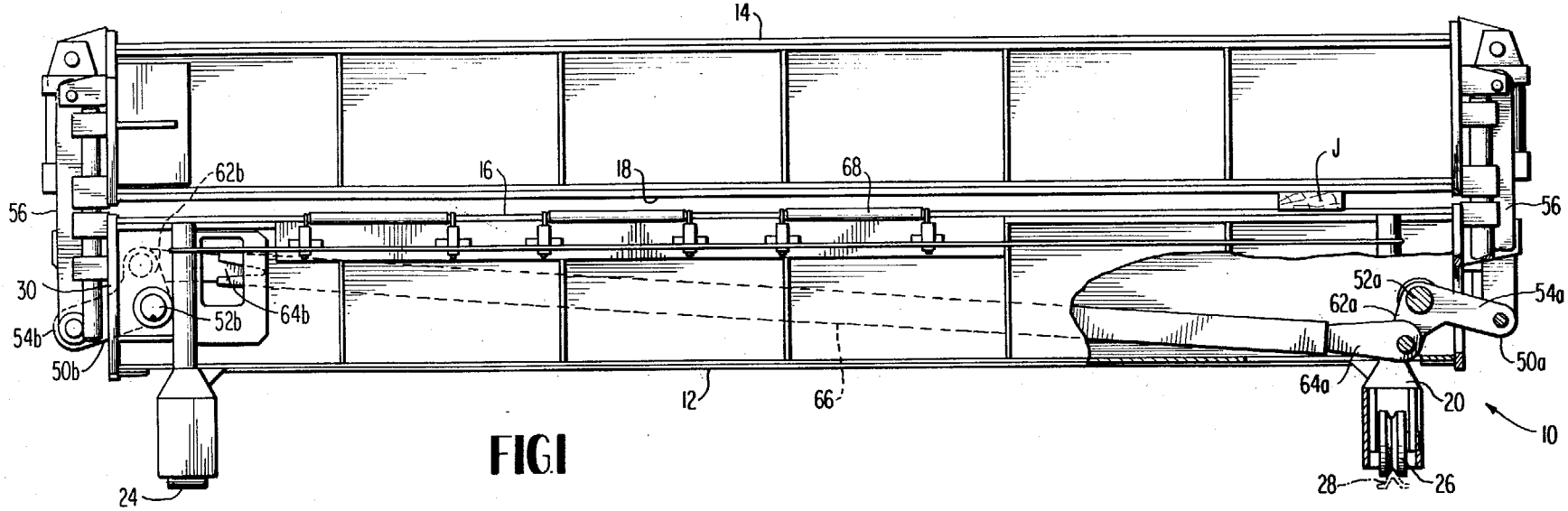
FIG. 1 is a side elevational view of a press constructed in accordance with the present invention.
Figure 2:
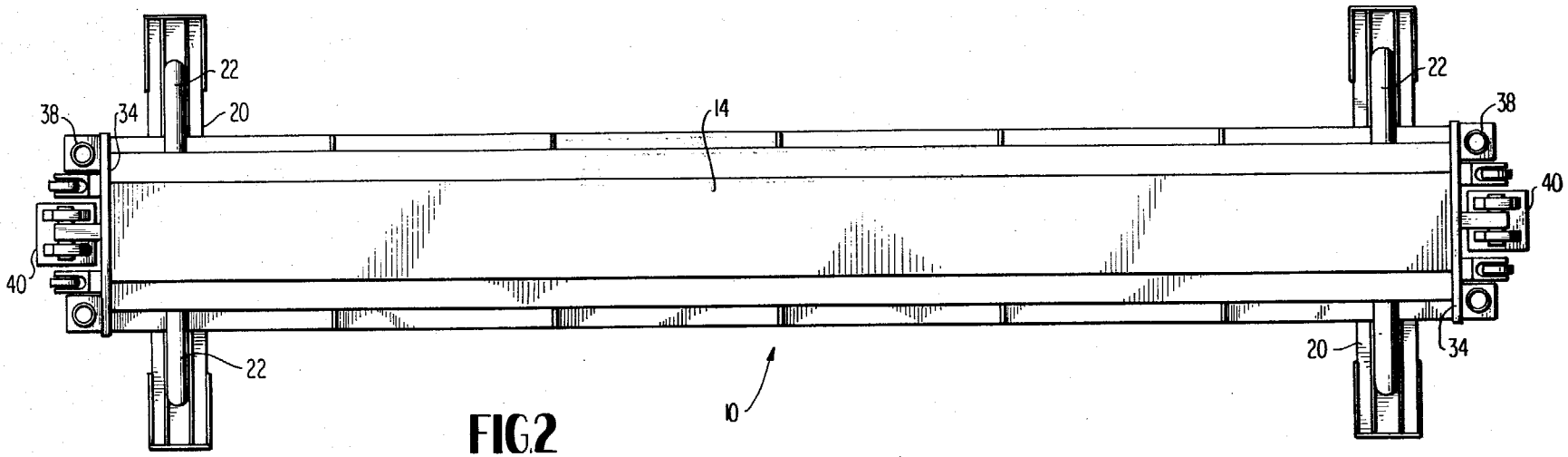
FIG. 2 is a top plan view thereof.

Referring now to the drawings, particularly to FIG. 1, there is illustrated a press, generally indicated 10, comprised of a base structure 12 and an upper floating head 14 movable toward and away from the base structure 12. The upper edge of base structure 12 mounts a lower press platen 16 while the lower edge of the moving head 14 carries an upper press platen 18. A pair of horizontal supports 20 underlie the base structure 12 at opposite ends of press 10. A pair of support arms 22 extend from opposite ends of each support 20 and are secured at their upper ends to the upper edge of base structure 12. Each support 20 mounts a pair of wheels. Particularly, the support 20 at one end of the press mounts a pair of flat wheels 24, while the support member 20 at the opposite end of the press mounts a pair of grooved wheels 26 for engagement along a track. Track 28 comprises an inverted elongated triangular-shaped member. Accordingly, press 10 is mounted for movement in a horizontal direction along a predetermined path for a distance at least as great as the maximum length of the trusses to be fabricated. It will be appreciated that the press hereof may be utilized with the truss fabricating system described and illustrated in copending U.S. Patent application Ser. No. 867,730, filed Oct. 20, 1969, now Pat. No. 3,603,244, of common assignee herewith, which application is incorporated herein by reference thereto as though fully set forth herein. Briefly, and with reference to that system, press 10 is movable longitudinally along the track 28 relative to the jig table, the joints of the various prepositioned members forming the truss, panel, or the like and carried by the jig table, and the connector plates spotted on opposite sides of the joint, with the jig table, truss members, and plates passing between the press platens 16 and 18. At each joint, the press stops and the movable head 14 presses the connector plates into the joint and then moves away from the completed joint, whereupon the press is again moved to the next joint and the operation is repeated.

An end plate 30 is carried by the base structure 12 at each of the opposite ends thereof. End plates 30 each carry a pair of vertically spaced guides 32 along opposite sides of the plate, the guides having vertically aligned openings. The floating head 14 also carries an end plate 34 at each of the opposite ends thereof. End plate 34 carries a pair of vertically spaced guides 36 at opposite sides thereof. At each end of the press, a pair of guide pins 38 are received within the openings in guides 32 and 36, the guide bars 38 being fixed to one of the upper guides 36. Accordingly, the floating head 14 is mounted for reciprocative vertical movement toward and away from the lower base structure 12.

To move the floating head 14 toward and away from base structure 12, a fluid-actuated cylinder 40 is coupled between base structure 12 and floating head 14 at opposite ends of the press. Particularly, at each end of the press the cylinder 40 is pivotally connected to a lug 42 fixed to the end plate 34 of the floating end 14. The piston rod 44, which depends from cylinder 40, terminates in a clevis 46 which is pivotally connected to a lug 48 fixed to the end plate 30 of the lower base structure 12. It will thus be appreciated that retraction and extension of piston rod 44 with respect to cylinder 40 respectively lowers and raises the floating head 14 relative to the base structure 12. Suitable fluid circuits, not shown, are provided for actuating the cylinder 40.

It is a feature of the present invention that load transfer apparatus is provided for the purpose of equalizing the loading carried by the cylinder, particularly when the press is subjected to asymmetrical loadings. In this manner, the full capacity of the cylinders may be applied at any point between the press platens, notwithstanding asymmetrical location of the loads along the press. To accomplish this, the present invention provides bellcranks 50a and 50b at respective opposite ends of the press and which bellcranks are pivotally mounted to the base structure 12 on respective pins 52a and 52b. Outwardly projecting legs 54a and 54b of bellcranks 50a and 50b are each pivotally connected to the lower ends of a pair of arms 56 by means of a pin 58. The upper ends of arms 56 are pivotally connected to a pair of elements 60 rigidly secured to the head 14. It will thus be appreciated that movement of the head 14 toward and away from the base structure 12 pivots bellcrank 50a in clockwise and counterclockwise direction as illustrated in FIG. 1. Concomitantly, the bellcrank 50b is pivoted in counterclockwise and clockwise directions, respectively. The lower leg 62a of bellcrank 50a connects with a clevis 64a while the upper leg 62b of bellcrank 50b pivotally connects with a clevis 64b. The opposite ends of the clevises 64a and 64b are rigidly secured at opposite ends of a transfer bar 66. Bar 66 comprises a rigid steel tubing which extends between the opposite ends of the press and below the lower press platen 16.

Accordingly, it will be appreciated that, as the head 14 moves toward base structure 12, the arms 56 at the left-hand end of the press, illustrated in FIG. 1, cause bellcrank 50b to rotate in a counterclockwise direction drawing transfer bar 66 toward bellcrank 50b. Simultaneously, the arms 56 at the right-hand end of the press illustrated in FIG. 1 rotate bellcrank 50a in a clockwise direction, moving the corresponding end of transfer bar 66 toward the opposite end of the press. That is, where the load on the press is symmetrical along the press plates the transfer bar merely follows the movements of the bellcranks 50a and 50b and is not itself loaded. In the event of an asymmetrical load, for example, a load caused by a truss joint disposed at the right-hand end of the press as illustrated at J in FIG. 1, the foregoing described movement of the arms, bellcrank and transfer arm is repeated. However, in this instance, the unloaded or partially loaded cylinder at the opposite end of the press tends to rotate bellcrank 50b in a counterclockwise direction causing the transfer bar 66 to be loaded in tension. That is, the transfer bar 66 tends to rotate bellcrank 50a in a clockwise direction and, hence, moves the right-hand end of the floating head 14 toward the press platen, thus applying the unused capacity of the left-hand cylinder to the fully utilized capacity of the cylinder at the right side of the press.

Conversely, if a joint J is located between the platens adjacent the left-hand end of the press as illustrated in FIG. 1, the bellcrank 50a on the right-hand side of the press tends to rotate in a clockwise direction in response to actuation of the corresponding cylinder. This loads the transfer bar 66 in compression. That is, the unused capacity of the cylinder 40 at the right-hand end of the press is transferred through the transfer bar to tend to rotate bellcrank 50b at the left-hand end of the press in a counterclockwise direction, whereby such unused capacity is applied at the left side of the press. In this manner, the entire capacity of the cylinders is applied to the load, regardless of its location along the press.

Also carried on the lower press platen are a plurality of rollers 68 which are spring-biased to extend just above the upper face of the lower press platen 16. The rollers tend to maintain the jig table, not shown, spaced from the lower platen 12 to facilitate movement of the press relative to the fixed jig table.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A press comprising: a base structure including a press platen, a head including a press platen in opposition to said first mentioned press platen, means connecting said head and said base structure for reciprocating movement of said head relative to said base structure including a fluid actuated cylinder connected between said head and said base structure at each of the opposite ends of said press, and means coupled between opposite ends of said press for transferring a portion of the force applied by the cylinder to said head at one end of said press to the head at the opposite end of said press, said coupling means including a bellcrank at opposite ends of said press, said bellcranks being pivotally carried by said base structure, a transfer bar interconnecting said bellcranks, a rod coupled between said bellcrank and said head at opposite ends of the press, said rods, bellcranks, and transfer bar being arranged such that rotation of one of said bellcranks in response to movement of said head toward said base rotates the other bellcrank in an opposite direction, the rod at one press end being subject to compressive forces and the rod at the other press end being subject to tensile forces in response to asymmetrical press loadings.

[ 2. A press comprising: a base structure including a press platen, a head including a press platen in opposition to said first mentioned press platen, means connecting said head and said base structure for reciprocating movement of said head relative to said base structure including a fluid actuated cylinder connected between said head and said base structure at each of the opposite ends of said press, and means coupled between opposite ends of said press for transferring a portion of the force applied by the cylinder to said head at one end of said press to the head at the opposite end of said press, said coupling means including a force transfer bar coupled to said base structure and said head such that said bar is subjected alternately to tension and compressive forces in response to loadings concentrated in opposite ends of the press respectively. ]

3. The press according to claim [ 2 ] *1*; including a plurality of wheels carried by said base structure for supporting said press, *and an elongated track*, said wheels being located adjacent opposite ends of said press with at least one of said wheels engaging said track whereby said press is mounted for longitudinal movement along said track.

[ 4. The press according to claim 2 wherein said coupling means includes a bell crank at opposite ends of said press, said bell cranks being pivotally carried by said base structure, a rod coupled between said bell crank and said head at opposite ends of the press, said rods, bell cranks, and transfer bar being arranged such that rotation of one of said bell cranks in response to movement of said head toward said base rotates the other of said bell crank in an opposite direction. ]

5. A press comprising: a base structure including a press platen, a head including a press platen in opposition to said first mentioned press platen, means connecting said head and said base structure for reciprocating movement of said head relative to said base structure including a fluid actuated cylinder connected between said head and base structure at each of the opposite ends of said press, means coupled between opposite ends of said press for transferring a portion of the force applied by the cylinder to said head at one end of said press to the head at the opposite end of said press, a plurality of rollers disposed on one side of said base structure and above the press platen carried thereby, and means mounting said rollers for movement below said latter press platen.

6. The press according to claim 5 wherein said coupling means includes a bellcrank at opposite ends of said press, said bellcranks being pivotally carried by said base structure, a transfer bar interconnecting said bellcranks, a rod coupled between said bellcrank and said head at opposite ends of the press, said rods, bell cranks, and transfer bar being arranged such that rotation of one of said bellcranks in response to movement of said head toward said base rotates the other bellcrank in an opposite direction.

7. The press according to claim 5 wherein said coupling means includes a force transfer bar coupled to said base structure and said head such that said bar is subjected alternately to tension and compressive forces in response to loadings concentrated adjacent opposite ends of the press, respectively.

8. The press according to claim 5 wherein the rod at one press end is subjected to compressive forces and the rod at the other press end is subjected to tensile forces in response to asymmetrical press loadings.

[ 9. A press comprising: a base structure including a press platen, a head including a press platen in opposition to said first mentioned press platen, means connecting said head and said base structure for reciprocating movement of one of said head and said base structure relative to the other of said head and base structure, a fluid actuated cylinder connected between said head and said base structure at each of the opposite ends of said press for moving said one of said head and said base structure relative to the other of said head and said base structure, and means coupled between opposite ends of said press for transferring a portion of the force applied by the cylinder to said one of said head and said base structure at one end of said press to the other of said head and said base structure at the opposite end of said press, said coupling means including a force transfer bar coupled to said base structure and said head such that said bar is subjected alternately to tension and compressive forces in response to loadings concentrated adjacent opposite ends of the press, respectively.]

[10. The press according to claim 9 wherein said coupling means includes a bell crank at opposite ends of said press, said bell cranks being pivotally carried by the other of said head and said base structure, a rod coupled between said bell crank and said one of said head and said base structure at opposite ends of the press, said rods, bell cranks, and transfer bar being arranged such that rotation of one of said bell cranks in response to movement of said one of said head and said base structure toward the other of said head and said base structure rotates the other bell crank in opposite direction.]

[11. The press according to claim 10 wherein the rod at one press end is subjected to compressive forces and the rod at the other press end is subjected to tensile forces in response to asymmetrical loadings.]

12. The press according to claim [9] *1* including a plurality of rollers disposed on one side of said base structure and above the press platen carried thereby, and means mounting said rollers for movement below said latter press platen.

*13. The press according to claim 5 including a plurality of wheels carried by said base structure, a track for supporting said press, said wheels being located adjacent opposite ends of said press with at least one of said wheels engaging said track whereby said press is mounted for longitudinal movement along said track.*

*14. The press according to claim 1 wherein each of said bellcranks includes a pair of legs and a pivot such that the legs relative to the pivot define an angle less than 180 degrees, the legs connecting with said rods extending outwardly from their respective pivots and from one another, the legs connecting with the transfer bar extending from their respective pivots in generally opposite direction such that the axis of said transfer bar defines an acute angle with a line parallel to the direction of the movement of said one of said head and said base structure.*

*15. The press according to claim 14 wherein said transfer bar intersects and crosses over a straight line intersecting the bellcrank pivots and at a location between said pivots.*

* * * * *